United States Patent Office 3,001,990
Patented Sept. 26, 1961

---

3,001,990
9α-HALO-11α-ALKYL-11β-HYDROXY STERIODS OF THE ANDROSTANE SERIES AND INTERMEDIATES THEREFOR
Gordon H. Thomas, New Brunswick, and Josef Fried, Princeton, N.J., assignors to Olin Mathieson Chemical Corporation, New York, N.Y., a corporation of Virginia
No Drawing. Filed Dec. 6, 1957, Ser. No. 700,935
7 Claims. (Cl. 260—239.55)

This invention relates to the synthesis of steroids and has for its object the provision of a new class of physiologically active steroids, which may be represented by the formula

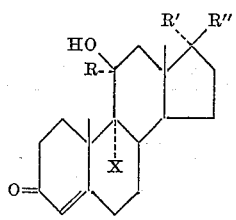

wherein R is lower alkyl (preferably methyl), R' is hydrogen or lower alkyl (preferably methyl), R" is hydroxy or acyloxy (particularly the acyloxy radical of a hydrocarbon carboxylic acid having less than ten carbon atoms), or together R' and R" is keto, and X is a halogen of atomic number greater than nine (i.e. iodine, bromine and particularly chlorine). These new steroids are physiologically active substances which possess androgenic activity. Hence the steroids of this invention can be used in lieu of known androgenic steroids, such as methyl testosterone, in the treatment of menopausal disturbances, being formulated for such administration in the same type of peroral preparations as methyltestosterone, for example, with concentration, and/or dosage based on the activity of the particular compound.

The new steroids of this invention are prepared by interacting 9α-fluoro-11-ketotestosterone, a 17-ester thereof, or 9α-fluoro-17α-lower alkyl-11-ketotestosterone (e.g., 9α-fluoro-17α-methyl - 11 - ketotestosterone) with pyrrolidine to yield the corresponding 3-pyrrolidino-Δ3,5-androstadiene derivative of the general formula

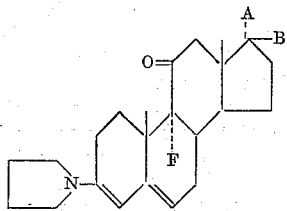

wherein A is hydrogen or lower alkyl, and B is hydroxy or acyloxy, which are new intermediates of this invention. The reaction is preferably conducted in an inert organic solvent for the steroid reactant (e.g. methanol) at an elevated temperature, such as the reflux temperature of the solvent.

The 3-pyrrolidino steroids are then interacted with a lithium lower alkyl (e.g. lithium methyl and lithium ethyl), followed by hydrolysis of the 3-pyrrolidino group in situ, preferably with a buffer consisting of sodium acetate-acetic acid, thereby yielding the new 9β,11β-epoxide intermediates of this invention, having the general formula

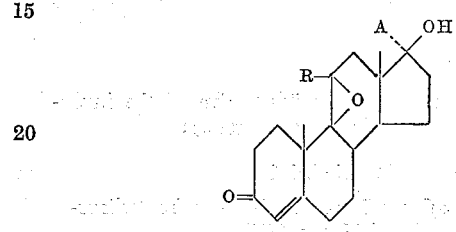

wherein A and R are as hereinbefore defined.

The epoxides are then reacted with a hydrogen halide, wherein the halogen has an atomic number greater than nine, to yield compounds of the first formula given hereinbefore wherein R" is hydroxy.

If a 17-ester is desired, the free 17-hydroxy compound can be acylated in the usual manner as by treatment with an acyl halide or acid anhydride of the desired acid. Particularly preferred are the acyl chlorides and acid anhydrides of hydrocarbon carboxylic acids having less than ten carbon atoms, as exemplified by the lower alkanoic acids (e.g., acetic, propionic and enanthic acid), the monocyclic aromatic carboxylic acids (e.g. benzoic and toluic acid), the monocyclic aralkanoic acids (e.g. phenacetic and β-phenylpropionic acid), the lower alkenoic acids, the cycloalkane carboxylic acids, and the cycloalkene carboxylic acids. The acylation is preferably conducted in the presence of an organic base, such as pyridine.

If a 17-keto steroids is desired and R' is hydrogen, the free 17β-hydroxy steroid can be oxidized in the usual manner, as by treatment with chromium trioxide in aqueous sulfuric acid to convert the 17β-hydroxy radical to a 17-keto derivative.

The process of this invention can be illustrated by the following schematic analysis employing 9α-fluoro-11-ketotes-tosterone, 9α-fluoro-11-ketotestosterone 17-acetate, and 9α-fluoro-17-methyl - 11 - ketotestosterone as starting materials:

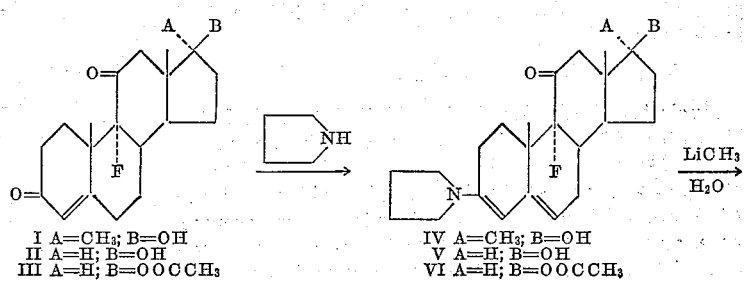

I A=CH₃; B=OH
II A=H; B=OH
III A=H; B=OOCCH₃

IV A=CH₃; B=OH
V A=H; B=OH
VI A=H; B=OOCCH₃

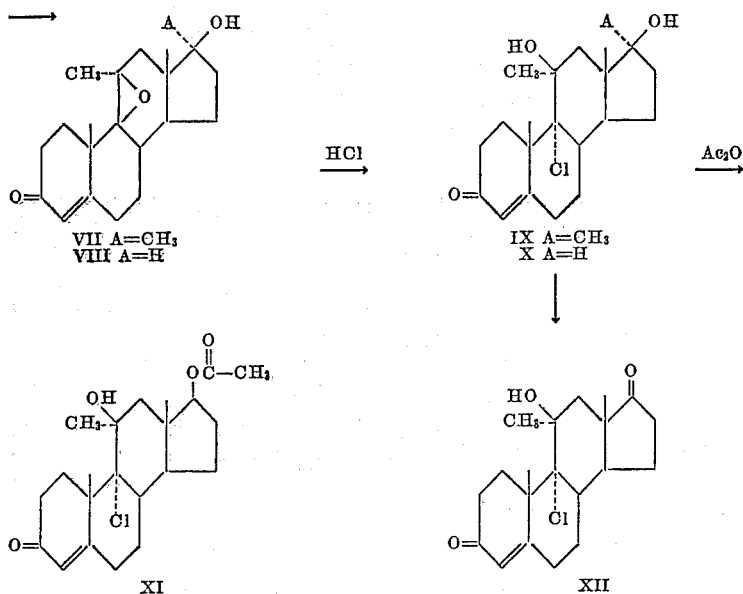

The following examples are illustrative of the invention (all temperatures being in centigrade):

EXAMPLE 1

*3-pyrrolidino-9α-fluoro-17α-methyl-Δ³,⁵-androstadiene-17β-ol-11-one (IV)*

To a refluxing solution of 983 mg. of 9α-fluoro-11-keto-17α-methyltestosterone (I) [prepared by the method disclosed by Herr et al., J. American Chemical Society, 78, 500 (1956)] in 10 ml. of methanol under nitrogen is added 1 ml. of redistilled pyrrolidine. Heating is continued for two minutes during which time crystals separate from solution. The crystals are collected, washed with a little cold methanol and dried in vacuo. About 1.01 g. of the 3-pyrrolidino compound (IV) is obtained, having a melting point of about 195–202° (dec.);

$\lambda_{max.}^{Nujol}$ 3.05 (broad), 5.78, 6.07, 6.20μ

EXAMPLE 2

*3-pyrrolidino-9α-fluoro-Δ³,⁵-androstadiene-17β-ol-11-one (V)*

(a) *Preparation of 9α-fluoro-11-ketotestosterone (II) and 9α-fluoro-11β-hydroxytestosterone.*—A solution of 3 g. of 9α-fluoro-11-keto-androstenedione in 200 ml. of methanol is stirred with 215 mg. of sodium borohydride at 0° for 1 hour. After acidifying the solution with a few drops of glacial acetic acid, it is concentrated to half its volume, diluted with water and the steroids extracted with chloroform. The chloroform is washed with water, dried over sodium sulfate and the solvent removed in vacuo. The residue is triturated with 50 ml. of benzene. The insoluble material is collected and crystallized from acetone-hexane to give about 790 mg. of 9α-fluoro-11β-hydroxytestosterone having M.P. about 224–230°. Crystallization from acetone-hexane yields an analytical sample having M.P. about 232–233°; [α]_D +133° (c. 1.04 in CHCl₃);

$\lambda_{max.}^{alc.}$ 239mμ (17,300); $\lambda_{max.}^{Nujol}$ 2.93, 6.05, 6.17μ

*Analysis.*—Calcd. for $C_{19}H_{27}O_3F$ (322.41): C, 70.77; H, 8.44; F, 5.89. Found: C, 71.27; H, 8.04; F, 5.89.

The benzene filtrate described above is absorbed on 100 g. of acid-washed alumina. Elution with chloroform (800 ml.) followed by crystallization from acetone-hexane gives about 780 mg. of 9α-fluoro-11-ketotestosterone (II), M.P. about 149–152°. Crystallization from acetone-hexane gives a pure sample, M.P. about 158–159°; [α]_D +168° (c. 0.95 in CHCl₃);

$\lambda_{max.}^{alc.}$ 234mμ (16,200); $\lambda_{max.}^{Nujol}$ 2.85, 2.92, 5.78, 5.97 6.12μ

*Analysis.*—Calcd. for $C_{19}H_{25}O_3F$ (320.40); C, 71.22; H, 7.87; F, 5.93. Found: C, 71.50; H, 7.76; F, 6.09.

Elution of the column with chloroform-acetone (1:1, 500 ml.) followed by crystallization from acetone-hexane yields about 200 mg. of the 11β-hydroxy compound, M.P. 228–232°.

(b) *Preparation of 3-pyrrolidino-9α-fluoro-Δ³,⁵-androstadiene-17β-ol-11-one (V).*—To a refluxing solution of 450 mg. of 9α-fluoro-11-ketotestosterone (II) in 4 ml. of methanol under nitrogen is added 0.4 ml. of redistilled pyrrolidine and heating is continued for two minutes during which time the 3-pyrrolidino compound (V) separates from solution. The crystals are collected, washed with a little ice-cold methanol and dried in vacuo. About 456 mg. of 3-pyrrolidino-9α-fluoro-Δ³,⁵-androstadiene-17β-ol-11-one is obtained having a M.P. of about 125–135° (dec.);

$\lambda_{max.}^{Nujol}$ 3.00, 2.79, 6.09, 6.21μ

EXAMPLE 3

*3-pyrrolidino-9α-fluoro-Δ³,⁵-androstadiene 17β-ol-11-one 17-acetate (VI)*

(a) *Preparation of 9α-fluoro-11-ketotestosterone 17β-acetate (III).*—A solution of 1.15 g. of 9α-fluoro-11β-hydroxytestosterone (prepared in Example 2, section a) in 10 ml. of pyridine and 3 ml. of acetic anhydride is heated at 80° for one hour. The mixture is diluted with water and the steroids extracted with chloroform, the chloroform extract then being washed with water and dilute hydrochloric acid, dried over sodium sulfate and evaporated to dryness in vacuo. Two crystallizations from methanol give about 510 mg. of 9α-fluoro-11β-hydroxytestosterone 17β-acetate, M.P. about 193–195°; [α]_D +105° (c. 0.96 in CHCl₃);

$\lambda_{max.}^{alc.}$ 239mμ (15,400); $\lambda_{max.}^{Nujol}$ 2.85, 2.94, 5.77, 5.87, 5.95, 6.06μ; $\lambda_{max.}^{CHCl_3}$ 2.90, 5.78, 6.00, 6.16μ

*Analysis.*—Calcd. for $C_{21}H_{29}O_4F$ (364.44): C, 69.21; H, 8.02; F, 5.21. Found: C, 69.49; H, 8.16; F, 5.07.

A solution of 400 mg. of 9α-fluoro-11β-hydroxytestosterone 17β-acetate in 7 ml. of acetone is stirred with 5 ml. of chromium trioxide in 0.67 N sulfuric acid (200 mg./ml.) for 30 minutes. The solution is then diluted with water, the precipitated solid collected and crystallized from acetone-hexane. The resulting 9α-fluoro-11-ketotestosterone 17β-acetate (III) (about 270 mg.) has M.P. about 234–235°; [α]$_D$ +117° (c. 1.39 in CHCl$_3$);

$\lambda_{max.}^{alc.}$ 234mμ (16,100); $\lambda_{max.}^{Nujol}$ 2.80, 5.80, 6.03, 6.20μ

*Analysis.*—Calcd. for C$_{21}$H$_{27}$O$_4$F (362.42): C, 69.59; H, 7.51; F, 5.24. Found: C, 69.84; H, 7.51; F, 5.12.

(b) *Preparation of 3-pyrrolidino-9α-fluoro-Δ$^{3,5}$-androstadiene-17β-ol-11-one 17β-acetate (VI)*.—To a refluxing solution of 575 mg. of 9α-fluoro-11-ketotestosterone 17β-acetate (III) in 10 ml. of methanol, is added 1 ml. of redistilled pyrrolidine. Heating is continued for 2 minutes, during which time the 3-pyrrolidino derivative (VI) separates from solution. The material (about 45 mg.) has M.P. about 160–170° (dec.);

$\lambda_{max.}^{Nujol}$ 5.74, 5.79, 6.10, 6.22μ

EXAMPLE 4

*9β,11β+-epoxy-11α,17α-dimethyltestosterone (VII)*

1.01 g. of 3-pyrrolidino-9α-fluoro-17α-methyl-Δ$^{3,5}$-androstadiene-17β-ol-11-one in 10 ml. of benzene is stirred under nitrogen with 10 ml. of an ethereal solution of lithium methyl (14.1 mg./ml.) for two hours. The solution is then cooled and 25 ml. of acetate buffer (comprising of 20 ml. of methanol, 2 ml. of methanol, 2 ml. of water, 1.6 ml. acetic acid and 1.6 g. of sodium acetate) is cautiously added, the reaction mixture then being refluxed for three hours. The mixture is diluted with water, and the steroids extracted with chloroform. The chloroform extract is washed with water, dried over sodium sulfate and the solvent removed in vacuo. The crystalline residue (about 716 mg.) so obtained has a melting point of about 246–248°. Crystallization of a sample from chloroform-methanol yields 9β,11β-oxido-11α,17α-dimethyltestosterone with M.P. about 249–250°; [α]$_D$ —24° (c. 1.33 in CHCl$_3$);

$\lambda_{max.}^{Nujol}$ 2.90, 6.05, 6.21μ

*Analysis.*—Calcd. for C$_{21}$H$_{30}$O$_3$ (330.45); C, 75.87; H, 9.25. Found: C, 76.32; H, 9.15.

EXAMPLE 5

*11α-methyl-9β,11β-epoxytestosterone (VIII)*

456 mg. of 3-pyrrolidino-9α-fluoro-Δ$^{3,5}$-androstadiene-17β-ol-11-one in 15 ml. of benzene is stirred under nitrogen with 10 ml. of an ethereal solution of lithium metal (10 mg. lithium/ml.) for 3.5 hours. The solution is then cooled and 25 ml. of acetate buffer (comprising of 20 ml. of methanol, 2 ml. of water, 1.6 ml. of acetic acid and 1.6 g. of sodium acetate) is cautiously added, the reaction mixture then being refluxed for 3 hours. The mixture is diluted with water, and the steroids extracted with chloroform. The chloroform is washed with water, dried over sodium sulfate and the solvent removed in vacuo. Crystallization from acetone-hexane gives about 140 mg. of 11α-methyl-9β,11β-oxidotestosterone (VIII) having M.P. about 198–203°; [α]$_D$ —6.5° (c. 1.03 in CHCl$_3$);

$\lambda_{max.}^{alc.}$ 244mμ (17,000); $\lambda_{max.}^{Nujol}$ 2.91, 6.06, 6.21μ

*Analysis.*—Calcd. for C$_{20}$H$_{28}$O$_3$ (316.42): C, 75.91; H, 8.92. Found: C, 76.10; H, 8.56.

The mother liquors from the above crystallization are evaporated to dryness in vacuo, the residue is dissolved in 25 ml. of benzene and absorbed on 6 g. of acid-washed alumina. Elution with chloroform-benzene (1:19, 300 ml.), followed by, crystallization from acetone-hexane gives about 70 mg. of the oxido compound (VIII) having M.P. about 195–203°.

EXAMPLE 6

*11α-methyl-9β,11β-epoxytestosterone (VIII)*

45 mg. of 3-pyrrolidino-9α-fluoro-Δ$^{3,5}$-androstadiene-17β-ol-11-one 17β-acetate in 10 ml. of benzene is stirred under nitrogen with 10 ml. of ethereal lithium methyl (15 mg. Li/ml.) for 3½ hours. The reaction mixture is then hydrolyzed with 25 ml. of acetate buffer as described in Example 5, and the steroids are isolated with chloroform. The chloroform solution is washed with water, dried over sodium sulfate and evaporated in vacuo. The residue is dissolved in 2 ml. of benzene and absorbed on 9 g. of acid-washed alumina. Elution with chloroform-benzene (1:19, 300 ml.; 1:9, 200 ml.), followed by crystallization from acetone-hexane gives about 50 mg. of 11α-methyl-9β,11β-epoxytestosterone having M.P. about 200–203°. The identity of this material with that described in Example 5 is confirmed by mixture M.P. determination and infrared comparison.

EXAMPLE 7

*9α-chloro-11β-hydroxy-11α,17α-dimethyl-testosterone (IX)*

A solution of 50 mg. of 9β,11β-oxido-11α,17α-dimethyltestosterone in 5 ml. of chloroform is treated with 2 ml. of 0.5 N hydrogen chloride in chloroform. The solution is allowed to stand at 0° for four hours and is then neutralized by the addition of aqueous sodium bicarbonate. More chloroform (20 ml.) is added and the reaction mixture is washed several times with water, dried over sodium sulfate and the solvent removed under reduced pressure. Crystallization of the residue from acetone-hexane yields about 41.6 mg. of the chloro-hydrin (IX), M.P. about 253–255° (dec.); [α]$_D$+132.2° (c. 0.8 in CHCl$_3$);

$\lambda_{max.}^{Nujol}$ 2.98, 6.04, 6.21μ

*Analysis.*—Calcd. for C$_{21}$H$_{31}$O$_3$Cl (366.91): C, 68.71; H, 8.52; Cl, 9.66. Found: C, 68.40; H, 8.44; Cl, 9.38.

Similarly, by substituting hydrogen bromide or hydrogen iodide in the procedure of Example 7, 9α-bromo-11β-hydroxy-11α,17α-dimethyltestosterone and 9α-iodo-11β-hydroxy-11α,17α-dimethyltestosterone are formed, respectively.

EXAMPLE 8

*9α-chloro-11β-hydroxy-11α-methyltestosterone (X)*

Following the procedure of Example 7 but substituting 50 mg. of 11α-methyl-9β,11β-epoxytestosterone for the epoxide reactant in the example, there is obtained 9α-chloro-11β-hydroxy-11α-methyltestosterone.

Similarly, by substituting hydrogen bromide and hydrogen iodide the 9α-bromo and 9α-iodo derivatives are formed respectively.

EXAMPLE 9

*9α-chloro-11β-hydroxy-11α-methyltestosterone 17β-acetate (XI)*

A solution of 40 mg. of 9α-chloro-11β-hydroxy-11α-methyltestosterone (X) in 3 ml. of pyrridine and 1 ml. of acetic anhydride is allowed to stand at room temperature for 18 hours. The mixture is diluted with iced water, the precipitated material collected, washed with water and dried in vacuo. Crystallization from acetone-hexane gives a pure sample of 9α-chloro-11β-hydroxy-11α-methyltestosterone 17β-acetate (XI).

Furthermore, by substituting other acylating agents, such as propionic anhydride and benzoyl chloride for the acetic anhydride in the procedure of Example 9, the corresponding ester derivatives are formed.

EXAMPLE 10

*9α-chloro-11α-methyl-Δ$^4$-androstene-11β-ol-17-one (XII)*

To a solution of 50 mg. of 9α-chloro-11β-hydroxy-11α-methyltestosterone (X) in 10 ml. of acetone is added with stirring sufficient chromium trioxide in 0.67 H. sulfuric acid (200 mg./ml.) to give a permanent brown coloration. After stirring the mixture at room temperature for 30 minutes, water is added. The steroids are extracted with chloroform, the chloroform extract then being washed with water, dried over sodium sulfate and evaporated to dryness in vacuo. Crystallization from acetone-hexane gives a pure sample of 9α-chloro-11α-methyl-Δ⁴-androstene-11β-ol-17-one (XII).

The invention may be otherwise variously embodied within the scope of the appended claims.

What is claimed is:

1. A steroid of the general formula

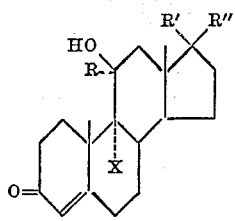

wherein R is lower alkyl, R' is hydrogen, R" is selected from the group consisting of hydroxy and the acyloxy radical of a hydrocarbon carboxylic acid having less than ten carbon atoms, and together R' and R" is keto, and X is a halogen of atomic number greater than nine.

2. 9α-halo-11α-methyl-11β-hydroxytestosterone, wherein the halo has an atomic number greater than nine.

3. 9α-chloro-11α-methyl-11β-hydroxytestosterone.

4. A steroid of the general formula

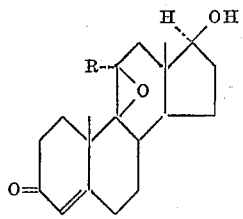

wherein R is lower alkyl.

5. 9β,11β-epoxy-11α-methyltestosterone.

6. A process for preparing a steroid of the general formula

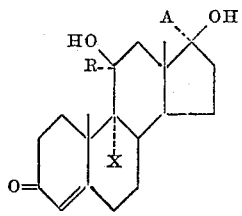

wherein R is lower alkyl and A is selected from the group consisting of hydrogen and lower alkyl, and X is a halogen of atomic number greater than nine, which comprises interacting the corresponding steroid of the general formula

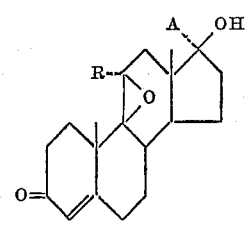

wherein R and A are as above defined, with a hydrogen halide wherein the halogen has an atomic number greater than nine.

7. A process for preparing a steroid of the general formula

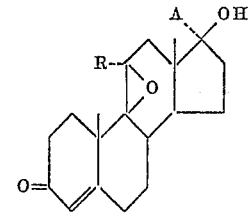

wherein A is selected from the group consisting of hydrogen and lower alkyl and R is lower alkyl, which comprises interacting a steroid of the general formula

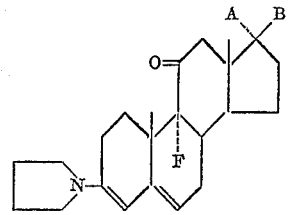

wherein A and R are as above defined and B is selected from the group consisting of hydroxy and the acyloxy radical of a hydrocarbon carboxylic acid having less than ten carbon atoms, with lithium lower alkyl in an aqueous medium and treating the product formed with a hydrolyzing agent.

References Cited in the file of this patent
UNITED STATES PATENTS

| | | |
|---|---|---|
| 2,793,218 | Herr | May 21, 1957 |
| 2,816,121 | Gould et al. | Dec. 10, 1957 |
| 2,837,517 | Herr | June 3, 1958 |